Sept. 10, 1957  F. S. TERRY  2,805,834
AUTOMATIC OR SEMI-AUTOMATIC WEIGHING APPARATUS
Filed Nov. 30, 1953  2 Sheets-Sheet 1

INVENTOR
Francis Sievwright Terry
By Merris & Bateman
ATTORNEYS

Sept. 10, 1957      F. S. TERRY      2,805,834
AUTOMATIC OR SEMI-AUTOMATIC WEIGHING APPARATUS
Filed Nov. 30, 1953      2 Sheets-Sheet 2
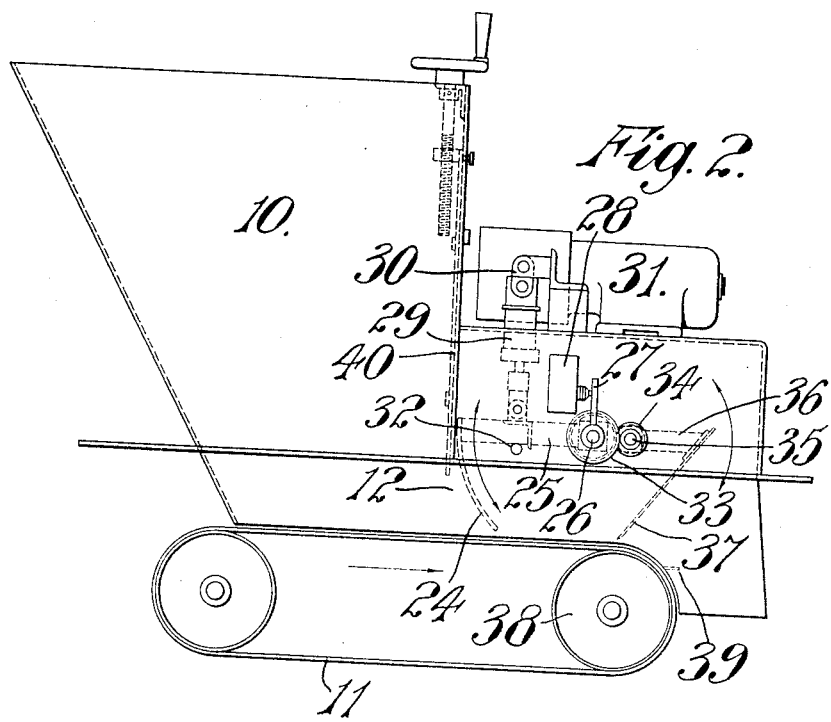
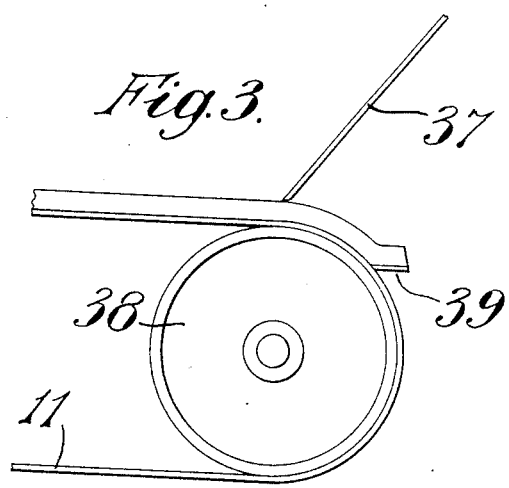
INVENTOR
Francis Sievwright Terry
By Morris L. Bateman
ATTORNEYS

United States Patent Office 2,805,834
Patented Sept. 10, 1957

2,805,834

AUTOMATIC OR SEMI-AUTOMATIC WEIGHING APPARATUS

Francis Sievwright Terry, Edgbaston, Birmingham, England, assignor to W. & T. Avery Limited, Smethwick, Birmingham, England, a British company Application November 30, 1953, Serial No. 395,220

2 Claims. (Cl. 249—42)

This invention relates to improvements connected with automatic or semi-automatic weighing apparatus of the kind incorporating an overhead feed hopper beneath which is disposed an endless belt conveyor which is adapted to convey material through an outlet beneath a wall of the overhead feed hopper and feed the material over one end of the conveyor into a weigh hopper suspended from load counterbalancing mechanism.

The object of the present invention is to provide weighing apparatus of this kind which is capable of weighing accurately a wide variety of powdered or granular materials and wherein the rate of feed of material to the weigh hopper during one feeding operation is gradually increased to a maximum and then gradually decreased prior to "cut-off" thereby reducing excessive movement of the levers of the load counterbalancing mechanism and minimising shocks imparted to the apparatus.

The invention consists of an automatic of semi-automatic weighing apparatus of the kind referred to characterised by the provision of a feed gate controlling the outlet from the feed hopper which gate is automatically raised and lowered in a predetermined interval of time during each feeding operation which interval is independent of the movements of the load counterbalancing mechanism.

A convenient embodiment of the present invention will now be described with particular reference to the accompanying drawings in which:

Fig. 2 is a view of the feed control mechanism on an enlarged scale, and

Fig. 3 is a further enlarged view of the end of the conveyor from which the material is fed showing the effect upon the blanket of material at "cut-off."

Figure 1:
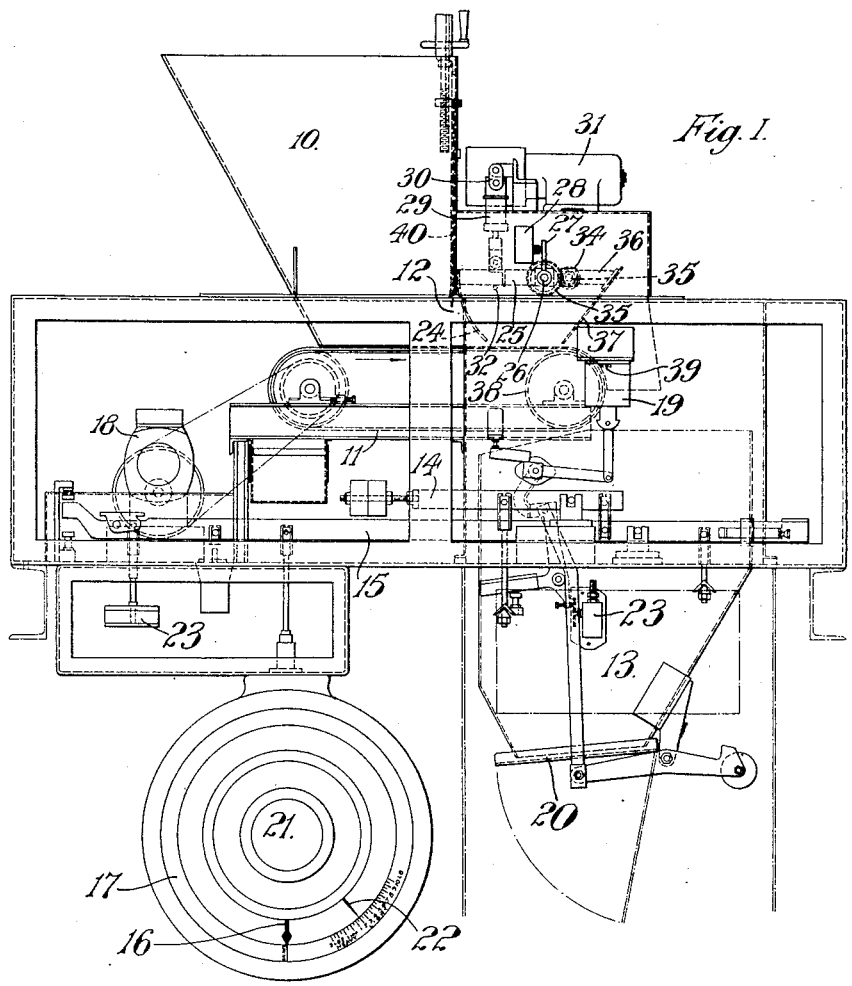
Fig. 1 is a front elevation of the apparatus.

There is provided an overhead bulk feed hopper 10 immediately beneath which is disposed a horizontally extending endless belt conveyor 11. This endless belt conveyor 11 is adapted to feed the material received from the overhead hopper 10, through an outlet 12 disposed below the lower edge of the one wall of the overhead hopper and to discharge the material from over the one end of the conveyor 11 into a weigh hopper 13 suspended from the levers 14 and 15 of the load counterbalancing mechanism. The load counterbalancing mechanism incorporates a pointer 16 which indicates zero balance and correct weight against an "over" and "under" weight chart 17.

The endless belt conveyor 11 is driven by a two speed geared electric motor 18 which is controlled, together with a solenoid 19 controlling the opening of the weigh hopper discharge door 20, by an electric contact which moves in synchrony with the indicator 16. This moving contact is adapted to co-operate with three contacts one of which, hereinafter termed the zero contact, is adapted to be contacted when no load is in the weigh hopper, a second, hereinafter termed the dribble contact, is adapted to be contacted slightly in advance of full load being fed to the weigh hopper and the third, hereinafter called the "cut-off" contact, is adapted to be contacted when full load is in the weigh hopper. The "cut-off" contact is angularly adjustable by means of a control knob 21 and is connected to an indicator 22 associated with the chart 17 which enables it to be utilised for adjusting the position at which cut-off of the feed is effected to accord with the weight of a predetermined batch in the following manner.

After placing weights on the counterpoise 23, suspended from the lever 15, which are proportional to the amount by which the desired batch is in excess of the full load reading of the chart 17 the pointer 22 is set at the full load position on the chart 17 and one batch is then fed to the weigh hopper. This batch if not correct in weight will result in a reading by the pointer 16 on the "over" and "under" weight indicator portion of the chart 17 of a few units "light" or "heavy." By now adjusting the pointer 22 by a corresponding number of units of weight subsequent weighings will be correct. For example, suppose the first batch results in a reading of 3 units "light" by the pointer 16 then by setting the pointer 22 to 3 units "heavy" on the next batch weighment "cut-off" will be effected 3 units later with the result that the pointer 16 should read "full" load. In this manner a ready means of adjusting the apparatus to any desired batch is achieved by one trial weighment only.

The contacts associated with the load counterbalancing mechanism are adapted to control the movements of the motor 18 driving the endless belt conveyor 11, that is to say, when the zero contact is closed then, provided the weigh hopper discharge door 20 is latched to close a contact 23 associated therewith, the conveyor 11 is traversed at full speed. When the dribble contact is contacted the speed of the conveyor 11 is reduced and when the "cut-off" contact is contacted the conveyor 11 is stopped and the discharge door 20 of the weigh hopper automatically unlatched by the solenoid 19.

Disposed adjacent and exterior to the outlet 12 from the overhead bulk feed hopper 10 is an arcuate feed gate 24 which is mounted upon an arm 25 laterally extending from a spindle 26 carrying a second laterally extending arm 27, hereinafter termed the contact arm, which co-operates with a micro-switch 28 when the feed gate 24 is at its lowest position. The arm 25 is pivotally connected to a connecting rod 29 in turn connected to a crank shaft 30, which is adapted to be rotated through one revolution by an electric motor 31 each time the aforesaid zero contact is closed and the weigh hopper door 20 is latched. When the feed gate 24 is at its lowest position the arm 25 abuts against a fixed stop 32 and in this position a small gap obtains between the lowest edge of the gate 24 and the upper run of the conveyor 11 so as to allow of a relatively thin blanket of material being fed there-between. In order to ensure that the feed gate 24 is returned to its lowest position in the event of an over-run of the motor 31 the connecting rod 29 is of a compressible nature, that is to say, it may be telescopic and spring loaded to an extended position and arranged so that its spring loading is compressed when the arm 25 abuts the stop 32 and the crank shaft 30 is at bottom dead centre.

In operation, assuming that the weigh hopper discharge door 20 is correctly latched and the zero contact associated with the load counterbalancing mechanism is contacted due to there being no load on the weigh hopper 13, then the conveyor 11 will be started at full speed and at the same time the motor 31 driving the crank shaft 30. The feed gate 24 will be raised thereby providing a gradual increase in the thickness of blanket of material passing from the overhead hopper 10 until the feed gate is in its fully raised position. Thereafter the feed gate will gradually descend until the arm 25 abuts against the fixed stop 32, at which point the contact arm 27 will contact the micro-switch 28 to stop the motor 31. The conveyor 11 which is still being driven at full speed will continue to feed under the feed gate 24 a blanket of material of minimum thickness until the weight in the weigh hopper 13 is such that the dribble contact is contacted. At this point in the operation the speed of the motor 18 driving the conveyor 11 is reduced and a dribble feed continues until the "cut-off" contact is contacted to effect a stopping of the conveyor.

Mounted upon the spindle 26 is a spur gear 33 which is in mesh with a second spur gear 34 mounted on a spindle 35 disposed parallel to the spindle 26 upon that side which is remote from the feed hopper 10. This spindle 35 carries a laterally extending arm 36 upon which is mounted a gate 37 which in its lowest position is inclined downwardly towards the feed hopper and has its lower edge disposed above the conveyor 11 by a distance substantially equal to the gap between the lower edge of the feed gate 24 and the conveyor when the said feed gate is in its lowest position. When in its lowest position the lower edge of the gate 37 is disposed vertically above the axis of rotation of the idle pulley or roller 38 around which the conveyor 11 passes at that end from which the material is fed from the conveyor. The gate 37 is adjustable relative to the arm 36 upon which it is mounted to admit of the variation of the gap between its lowest edge and the conveyor 11.

It will be appreciated that since the gate 37 is geared to the feed gate 24 it is driven through an exactly similar cycle and when in its lowest position merely skims the top of a blanket of material of normal thickness passing under the feed gate 24. Should, however, the blanket of material become uneven during the dribble feed the gate 37 will pare off from the blanket any excess material and retain it on the conveyor 11 between the two gates. This excess material which is held between the two gates will subsequently be fed to the weigh hopper 13 at the beginning of the next weighing cycle when the two gates are raised.

At the delivery end of the endless belt conveyor and slightly below the upper run thereof, but in close proximity to the conveyor belt as it passes around the idle pulley or roller 38, is a strip of metal 39 extending across the entire width of the belt so as to form a ledge or shelf onto and over which the material is fed from the conveyor to the weigh hopper. Material being fed by the conveyor is thus parted from the belt and is pushed over the surface of this ledge or shelf 39 from the opposite edge of which it falls cleanly. By this means when the conveyor is stopped a clean break in the flow of material is achieved.

A vertically adjustable slide 40 forming a portion of the one wall of the overhead hopper 10 provides means whereby the size of the outlet 12 from the feed hopper can be adjusted to suit varying materials, though it will be appreciated that the size of this outlet merely determines the rate of feed whilst the feed gate 24 is raised, the rate of feed at all other times being determined by the gap obtaining between the lower edge of the feed gate 24 and the upper run of the conveyor and the speed of the conveyor.

The arc of curvature of the feed gate 24 is struck from the axis of the spindle 26 and the face of the feed gate is thereby disposed in close proximity to the one wall of the overhead hopper 10 no matter what the setting of the feed gate.

It is to be appreciated that the raising and lowering of the feed gate 24 is affected in a predetermined time once the associated motor 31 is started and this feed gate 24 is in no way controlled by the movements of the load counterbalancing mechanism. It is however desirable that sufficient time should be provided for the raising and lowering of the feed gate to ensure that the gate is returned to its lowest position before the dribble contact is contacted and the speed of the conveyor 11 reduced.

I claim:

1. Weighing apparatus comprising a feed hopper, weighing mechanism, a conveyor for conducting material from the feed hopper to the weighing mechanism, means controlled by the weighing mechanism for starting and stopping the conveyor, a feed gate for controlling rate of flow of material from the feed hopper to the conveyor, means controlled by the weighing mechanism for raising the feed gate to effect full flow and dribble flow of material to the conveyor and for fully lowering said gate independently of the weighing mechanism after a predetermined interval of time, a second gate spaced from the feed gate longitudinally of the conveyor, and means for raising and lowering the second gate synchronously with raising and lowering of the feed gate to permit full flow of material while both of said gates are raised and for retaining excess material between the gates while they are lowered.

2. Weighing apparatus as defined in claim 1, including a strip extending transversely across the conveyor beyond said gates and toward the discharge end of the conveyor and forming a shelf to receive and retain material from the conveyor when the conveyor is stopped.

References Cited in the file of this patent

UNITED STATES PATENTS

| | | |
|---|---|---|
| 1,046,885 | Standefer | Dec. 10, 1912 |
| 1,447,680 | Michie | Mar. 6, 1923 |
| 1,829,182 | Beaumont | Oct. 27, 1931 |
| 1,834,787 | Kilcarr | Dec. 1, 1931 |
| 1,970,291 | Everhard | Aug. 14, 1934 |
| 1,994,797 | Thomas | Mar. 19, 1935 |
| 2,058,775 | Cundall | Oct. 27, 1936 |
| 2,071,443 | Weckerly | Feb. 23, 1937 |
| 2,139,903 | Mason et al. | Dec. 13, 1938 |
| 2,207,885 | Howard | July 16, 1940 |
| 2,213,599 | Weckerly | Sept. 3, 1940 |
| 2,387,585 | Howard | Oct. 23, 1945 |
| 2,466,386 | Curioni | Apr. 5, 1949 |
| 2,614,786 | Caron et al. | Oct. 21, 1952 |
| 2,676,733 | Lober | Apr. 27, 1954 |